(12) United States Patent
Ahmed

(10) Patent No.: US 10,856,692 B2
(45) Date of Patent: Dec. 8, 2020

(54) THIN PROFILE MULTI-TUBE BURNER FOR GAS GRILL

(71) Applicant: Char-Broil, LLC, Columbus, GA (US)

(72) Inventor: Mallik R. Ahmed, Columbus, GA (US)

(73) Assignee: Char-Broil, LLC, Columbus, GA (US)

( * ) Notice: Subject to any disclaimer, the term of this patent is extended or adjusted under 35 U.S.C. 154(b) by 220 days.

(21) Appl. No.: 15/880,268

(22) Filed: Jan. 25, 2018

(65) Prior Publication Data

US 2018/0228316 A1   Aug. 16, 2018

Related U.S. Application Data

(62) Division of application No. 14/198,176, filed on Mar. 5, 2014, now abandoned.

(60) Provisional application No. 61/772,828, filed on Mar. 5, 2013.

(51) Int. Cl.
| *F24B 3/00* | (2006.01) |
| *A47J 37/07* | (2006.01) |
| *F23D 14/10* | (2006.01) |
| *F23D 23/00* | (2006.01) |

(52) U.S. Cl.
CPC .......... *A47J 37/0713* (2013.01); *F23D 14/10* (2013.01); *F23D 23/00* (2013.01); *F23D 2203/1012* (2013.01); *F23D 2900/00017* (2013.01)

(58) Field of Classification Search
CPC ............................ A47J 37/0713; F23D 14/10
See application file for complete search history.

(56) References Cited

U.S. PATENT DOCUMENTS

| 585,631 | A | | 6/1897 | Langwith | |
|---|---|---|---|---|---|
| 1,396,211 | A | * | 11/1921 | Humphrey | F23D 14/10 431/280 |
| 2,253,834 | A | | 8/1941 | Volks | |
| 4,356,810 | A | * | 11/1982 | Ferlin | F23C 5/02 126/41 R |
| 7,959,433 | B2 | | 6/2011 | Huff | |
| 2003/0213484 | A1 | | 11/2003 | Alden et al. | |
| 2007/0048683 | A1 | | 3/2007 | Huff | |
| 2009/0165774 | A1 | | 7/2009 | Johnston | |
| 2010/0001087 | A1 | | 1/2010 | Gum | |
| 2010/0095951 | A1 | * | 4/2010 | Ahmed | A47J 37/0682 126/39 D |

FOREIGN PATENT DOCUMENTS

| CN | 101126506 | 2/2008 |
| CN | 101889172 | 11/2010 |
| CN | 102186389 | 9/2011 |
| WO | PCT2014020884 | 8/2014 |

* cited by examiner

*Primary Examiner* — Jason Lau
(74) *Attorney, Agent, or Firm* — David G. Woodral; GableGotwals

(57) ABSTRACT

A burner assembly for a gas grill has a venturi tube for conveying gas to a burner. A burner tube has front and back manifolds, with the venturi tube connected to the front and back manifolds. A flow restrictor is placed at a connection interface between the burner tube and front manifold.

9 Claims, 9 Drawing Sheets

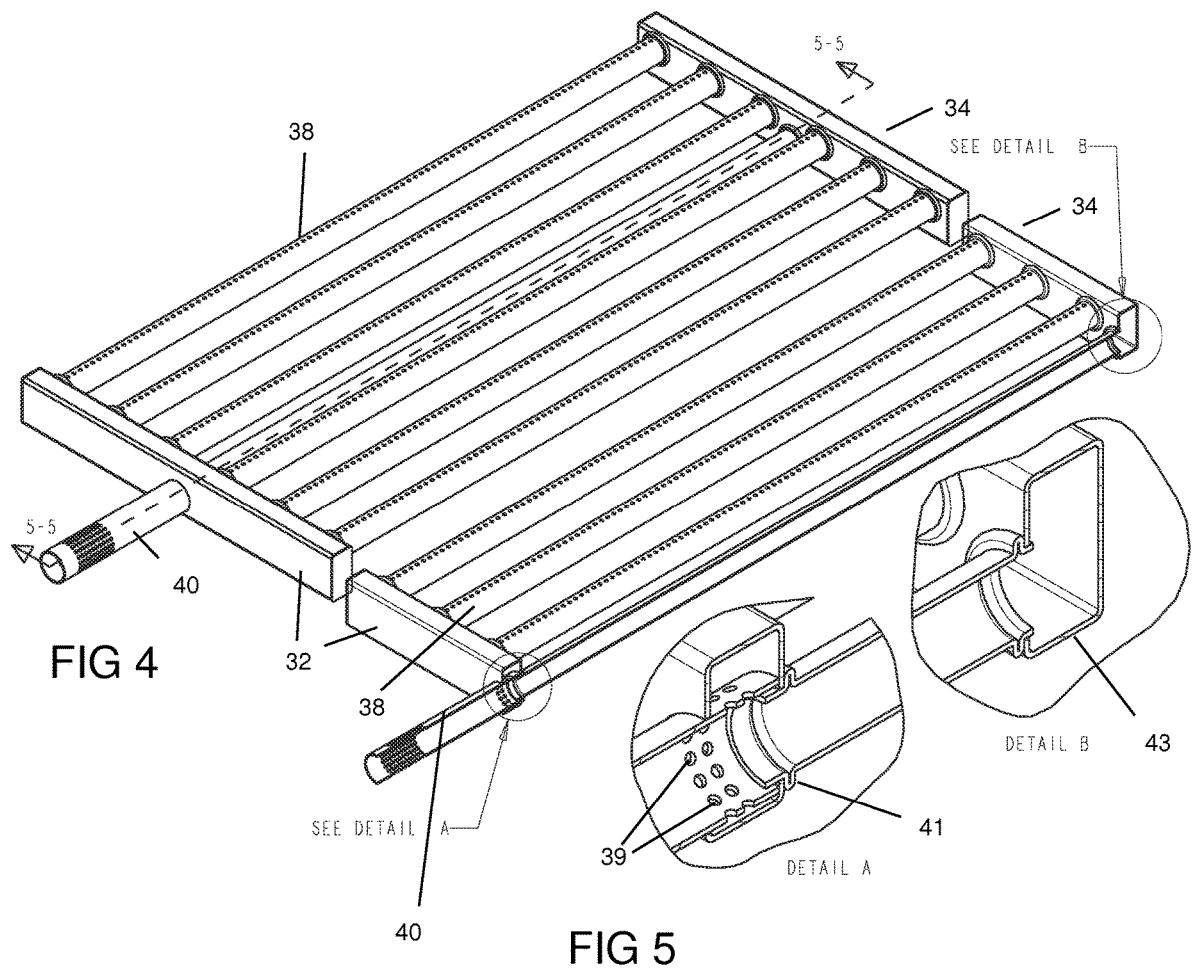

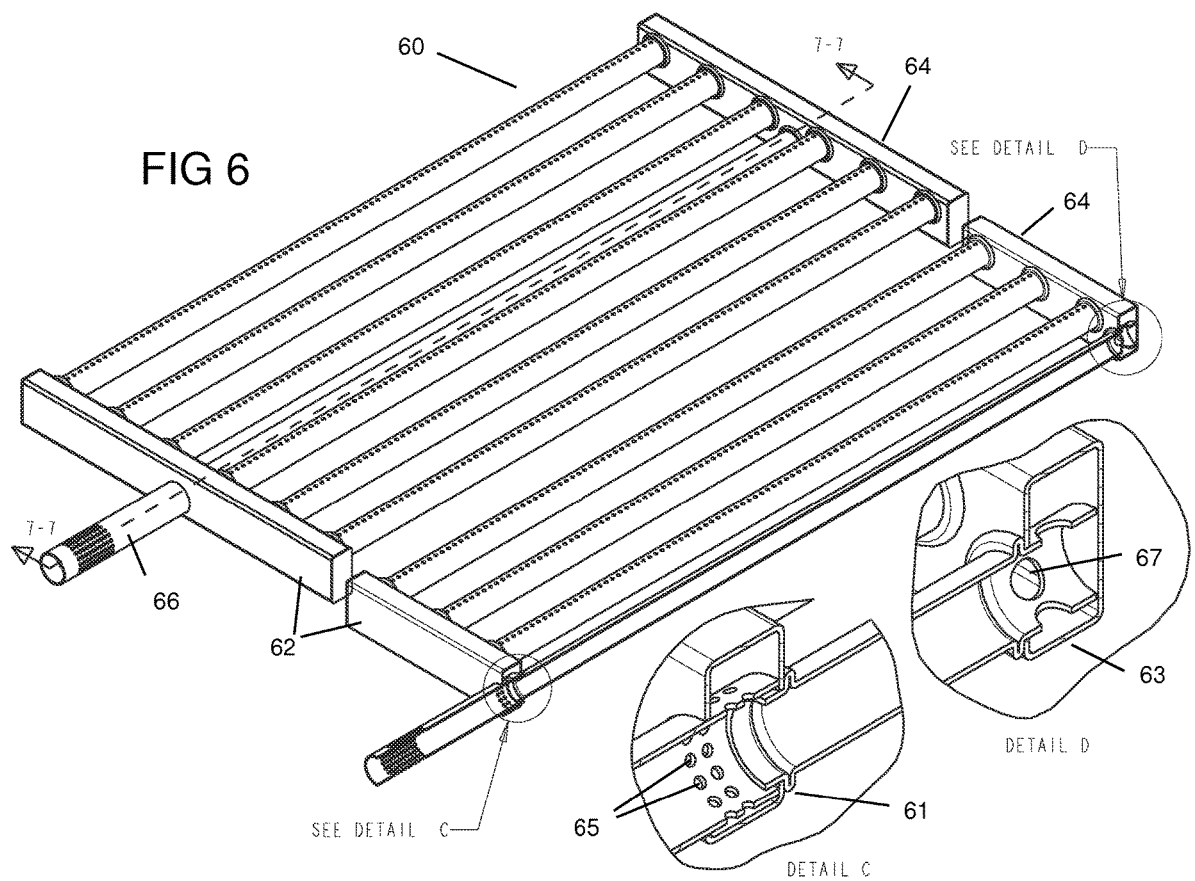

THIN PROFILE MULTI-TUBE BURNER FOR GAS GRILL

CROSS-REFERENCE TO RELATED CASES

This application is a Divisional of U.S. patent application Ser. No. 14/198,176 filed on Mar. 5, 2014 which claims the benefit of U.S. Provisional Patent Application Ser. No. 61/772,828 filed on Mar. 5, 2013, the contents of each of which are hereby incorporated by reference.

BACKGROUND OF THE INVENTION

In the present art, most gas grills have very bulky fireboxes with several drawbacks: 1) they are heavy to handle and install, and the weight makes them expensive for shipping and handling, 2) they are expensive to make due to more materials, and 3) they are thermally inefficient because of the large volume of the firebox. When several types of present market grills were studied it was understood why the fireboxes were made so bulky. The main reason was the burner design. In the majority of the cases, a single tube burner was used under an average 150 sq. in. (17"L.×0.8 ½"W) cooking area, although, in some cases, two tube burners with single control valves were used under a 200 to 240 sq. in. cooking area. These conventional burner designs require a large fire box to achieve sufficient heat for cooking and to pass combustion tests required for safe use.

SUMMARY OF THE INVENTION

The problem to be solved was how to make a firebox as thin as possible for a gas grill. To make a thinner firebox, the burner tube needs to be located closer to the cooking grate. The main challenge associated with this approach is the failure of the combustion test that is required for product certification. The limited number of ports on a single tube burner burns the gas with taller and stronger flames which impinge on the cooking grate or radiant element and fails the combustion test. To solve this issue, the burner needs to be designed with multiple tubes so that more burner ports can be accommodated to make flames shorter and weaker to avoid flame impingement. An additional venturi tube or tubes are added, to communicate with multiple manifolds, such as a front and rear manifold. Other adjustments are also made to equalize gas pressure in the form of flow restrictors and the like.

BRIEF DESCRIPTION OF THE DRAWINGS

FIG. 4 is another perspective view of the burner shown in FIG. 3;

FIG. 5 is a cross-sectional view taken along line 5-5 of FIG. 4 with detail views A and B of the venturi-manifold interface;

FIG. 6 is a perspective view of an alternate embodiment of the present thin profile burner;

FIG. 7 is a cross-sectional view taken along line 7-7 of FIG. 6 with detail views C and D of the venturi-manifold interface;

DETAILED DESCRIPTION OF THE PREFERRED EMBODIMENTS

Figure 1:
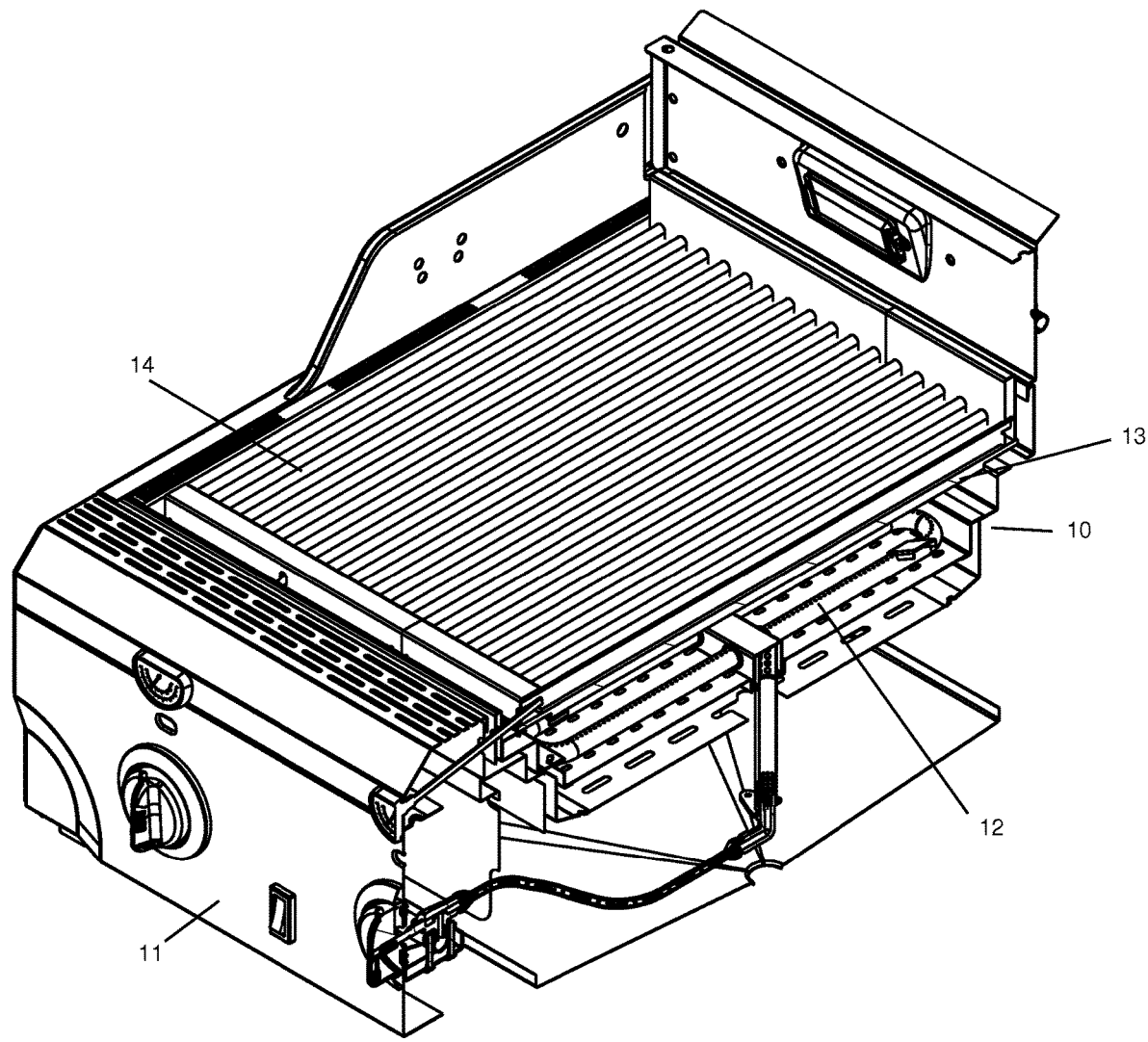
FIG. 1 is a partial cutaway view of one type of prior art burner in a grill structure.

Referring now more specifically to the drawings and to FIG. 1 in particular, 10 designates generally a gas barbecue grill firebox. Firebox 10 is can be mounted on a cart assembly as is well known in the art, or it can be mounted in a stationary construction of appropriate material such as on a post or in an outdoor kitchen. The firebox has a front panel 11 with controls for the gas valves and also for ignition of the gas. Disposed in the firebox 10 is a parallel tube burner 12. Mounted above the burner 12 is a radiant material, such as ceramic glass or metal plate 13, which serves as the infrared emitter that is heated by the burner. Mounted above the emitter 13 is a cooking grate 14, upon which the food to be cooked is placed.

Figure 2:
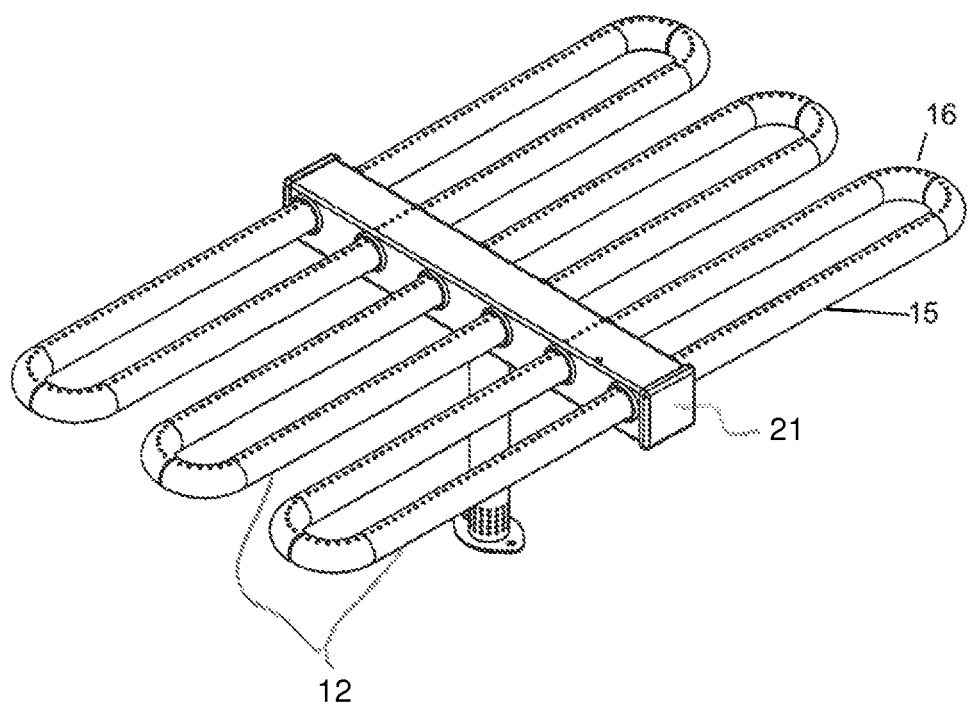
FIG. 2 is a perspective view of the type of prior art burner shown in FIG. 1.

It can be seen in the cut-away version that the burner 12 is formed in a grid like arrangement having generally parallel longitudinal members 15 that are connected at each end thereof by semi-circular conduits 16. The longitudinal members 15 can be formed continuously with the semi-circular conduits sections 16 or they can be separately formed and assembled into a gas manifold in the center, as shown in FIG. 2. Gas is admitted to the burner tubes by methods known to the art and illustrated in FIGS. 1 and 2 involving a control knob operating a gas valve sending propane gas through suitable conduits to an aspirator where the gas is mixed with primary combustion air and sent to the manifold 21 for distribution to the gas burner tubes 12. In the prior art embodiment shown in FIGS. 1 and 2, no reduction in the depth of the burner system has been attempted and products of combustion are routed to the front and back of a flat plate re-radiating element.

Ignition of the gas in the burner tubes may be accomplished by use of a spark generator arcing across an electrode (not shown), suitably placed in proximity to the burner 12, a hot surface igniter similarly placed, and other known methods.

Figure 3:
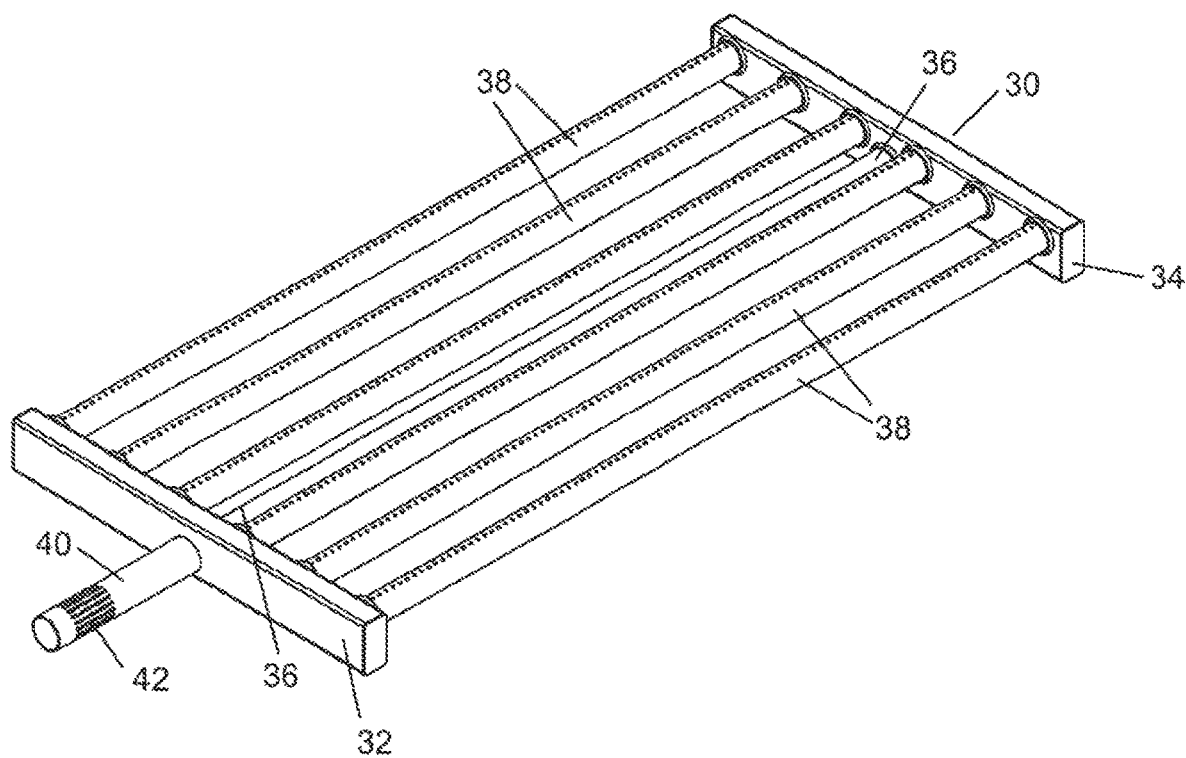
FIG. 3 is a perspective view of an embodiment of the present thin profile burner.

FIG. 3 is a perspective view of one embodiment of the present thin profile burner 30. This burner has a front manifold 32, a rear manifold 34, and at least one elongated venturi tube 36, shown here in the center of the burner. The elongated venturi tube is in fluid communication with the front and rear manifolds. The burner tubes 38 are also in fluid communication with the front and rear manifolds. A suitable combustible gas is introduced into the burner via venturi tube 40. As the gas enters, it draws some, if not all of the air necessary for combustion through aspirator 42, in a manner known in the art. For ease of description, the combustible gas/air mixture will generally be referred to herein as the gas supply.

As shown in FIGS. 4 and 5 with the detailed views A and B, the gas supply entering the front manifold is restricted with flow restriction means such as relatively small holes 39 or baffles (Detail view A) while there is no restriction in the back (Detail view B). In the prior art, the gas would normally have higher pressure in the front manifold 32 than in the rear manifold 34, if prior art burners were constructed with two manifolds, which they are not, by virtue of the gas supply first entering the front manifold. In the prior art burner shown in FIG. 2, the gas has higher pressure in the portions of the burner tubes that are closest to the gas inlet. The baffles or holes 39 at least partially inhibit the entry of the gas supply. The flow restriction means are shown here in the venturi tube. They may also be built into the manifold and achieve essentially similar results.

Prior art constructions would result in relatively strong flames in the front burner tubes and relatively weaker flames in the rear burner tubes. Thus, even heating would be and is, difficult to achieve, with concomitant variations in evenness of cooking, hot spots, and generally inefficient performance. With the restriction holes in the front manifold supply interface 41 and no restriction in the rear manifold supply interface 43, gas is evenly distributed and the flames are of substantially equal height tall in the front and back.

Referencing again Detail A in FIG. 5, instead of the conventional, fully-open, venturi tube of the prior art, flow restrictors in the form of small holes 39 are built into the elongated venturi tube or the manifold itself, at the front venturi manifold interface 47. This contrasts with the fully-open interface 43 of the elongated venturi tube 36 and the rear manifold 34. This construction equalizes the gas pressure between the front and rear manifolds and, consequently, in the burner tubes, themselves. The resultant flames when the combustible gas-air mixture is ignited are relatively short and have lesser velocity than is seen in prior art designs. Thus, the burner can have a thinner profile and be located closer to an IR emitter or other radiant material placed between the burner and the cooking grate.

Looking at the detail of FIG. 5, it will be seen that the elongated venturi tube opens with its full diameter into the rear manifold and through a set of 32 small holes into the front manifold. The ratio of area at the front to area at the rear is 60%. In this case the opening to the rear manifold is at its maximum and cannot be further increased. It will be apparent to those skilled in the art that the difference in the flow resistance between entrance to the rear manifold and the entrance to the front manifold as shown in the detail of FIG. 5 is greater than that given by the ratio of areas. This is because, given the same initial conditions, the pressure drop across many small openings is much greater than the pressure drop across one large opening of the same area. This is a well known fact of fluid mechanics.

Depending on the size of the burners, the desired flow rate, and the type of gas, variation of the area ratio may be necessary and can be changed by varying the number and size of the holes in the front and by introduction of the feature shown in FIG. 7 in the rear where the area of openings into the rear manifold could be the same as the diameter of the diameter of the venturi tube but flow resistance will be greater. Alternatively, the area of the openings could be made smaller than the area of the venturi tube and still be larger than the openings to the front manifold.

Given these possible variations, the ratio of areas of inlet to the front manifold to the areas of inlet to the back manifold could be from 50% to 70%. Or they could range from 40% to 75%. The object is to balance the pressure and flow in the front and rear manifolds to avoid the undesirable effects outlined previously.

An alternate embodiment is shown in FIGS. 6 and 7. Here, burner 60 has front manifold 62, rear manifold 64, and central elongated venturi tube 66. In this design, both ends of the venturi tube/front manifold interface 61 and the venturi tube/rear manifold interface 63 are constructed with flow reducing apertures. As shown in Detail views C and D, the apertures 65 at the front interface are smaller than the apertures 67 at the rear interface. The consequent reduction in gas pressure at the front results in equalization of gas pressure between the front and rear manifolds, and thus in the connected burner tubes, themselves.

While the flow restrictors are shown and described as apertures, other means for restricting the gas flow are contemplated, such as slits, gates, valves, and other means known in the art may be utilized.

Another embodiment exhibits a construction wherein the port sizes in the burner tubes are varied to equalize the gas pressure. In this design, the burner ports nearer or at the center of the tubes are larger than those closer to the ends. This also accomplishes pressure equalization.

The burners 30 and 60, shown in the appended figures, are shown with a central elongated venturi tube. This is not meant to be limiting and the additional one or more front-rear connecting venturi tubes can be located in a different position or positions, i.e. off-center, left, right, etc. The venturi tube/manifold conduit may be formed as a single fabrication or it may be separate pieces formed and connected in a fluid-tight manner.

After having successful results with the combustion tests, the system was tested thoroughly and had some unexpected results:

1) Burner heats up the grate very evenly. Delta-T of this system was within 5 degree Fahrenheit versus the conventional systems which have that number from 25 to 50 degrees.

2) System is very energy efficient. With minimum volume of the firebox, wastage of energy is reduced significantly and also as the cooking grate is very close to the burner flame, with a 3500 degree F. temperature, it gets a substantial amount of infrared energy directly from the flames. A conventional system is about 20% to 35% thermally efficient but the present system goes over 40% efficient, depending on the cooking grate used.

3) Preheat time is significantly reduced. A conventional grill takes 10 to 15 minutes to preheat, but the present system takes only 2 minutes to preheat. It literally heats up the grate instantly.

4) By virtue of the food being closer to the heat source, it receives a higher percentage of IR heat which keeps the food juicier.

5) With the present burner system, hot spots are eliminated and with the proper cooking grate system, flare-ups are eliminated as well.

Figure 8:
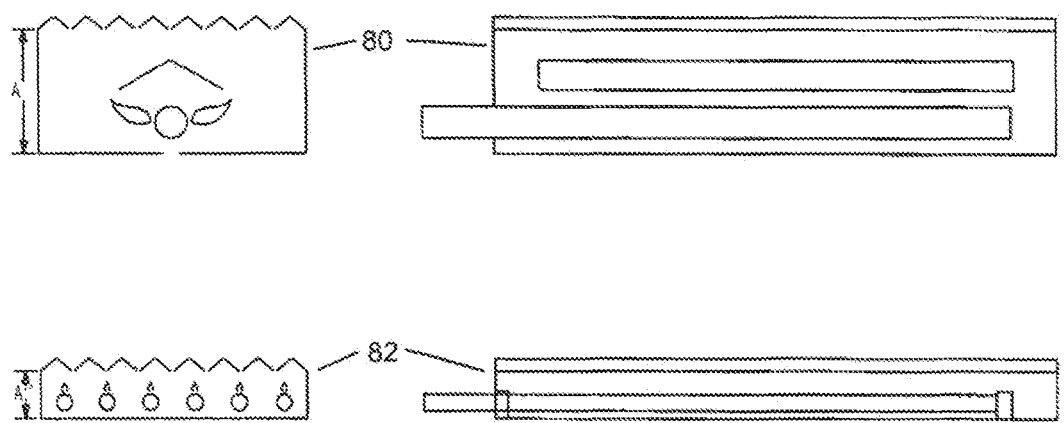
FIG. 8 is a diagrammatical view showing relative profiles of a prior art burner and the present thin profile burner.

Thus, the optimum design was achieved to have a thin firebox system. While it depends on the size of the system, on a conventional cooking size of 150 sq. in. (17"L.×0.8 ½"W) the depth of the firebox 80, (from under the cooking grate to the bottom of the firebox) is usually 4 inches, (reference dimension A in FIG. 8). With the present burner system, the depth/thickness of the firebox 82 can be made to approximately 1½ inches thick (reference dimension A' in FIG. 8). To give an idea of how thin this system can be, both conventional and the present systems are shown diagrammatically in FIG. 8. Note that although there are multiple tubes in the burner, the burner is controlled by only one valve. This, of course, can be varied depending on the size of the grill. This reduction in depth saves on manufacturing costs, replacement costs, and material costs, all while providing performance vastly superior to burners of the prior art.

Figure 9:
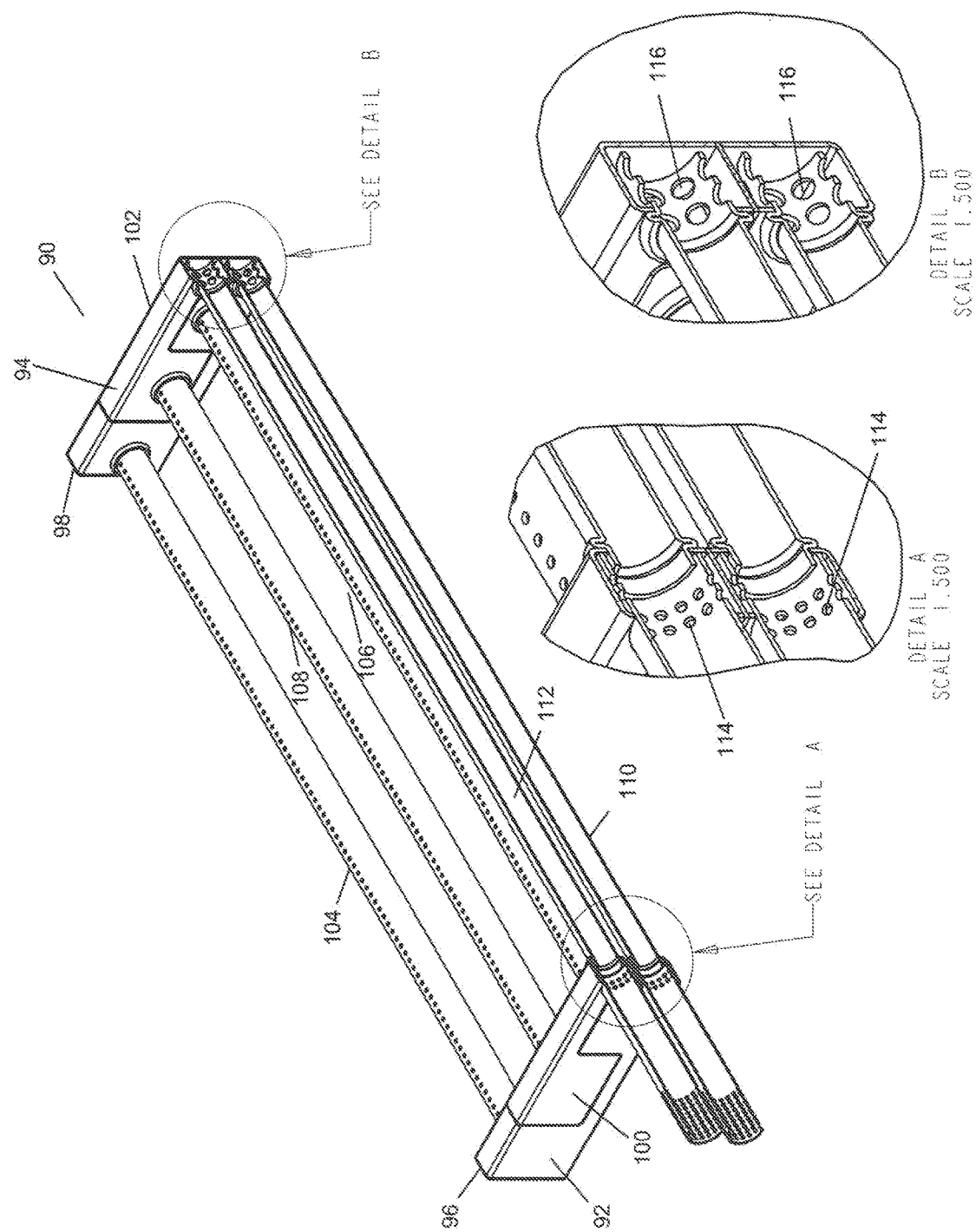
FIG. 9 is a perspective view, shown partially in cross-section, of an alternate embodiment of the present burner, with detail views A and B of the venturi-manifold interface.

An alternate embodiment of the present burner is shown in FIG. 9. Burner 90 has a lower section 92 and an upper section 94. Each section has front and rear manifolds, 96 and 98 and 100 and 102, respectively. Lower section 92 has two burner tubes 104 and 106 that are in fluid communication with front and rear upper manifolds 100 and 102.

The flammable gas/air mixture is supplied to the burner through lower and upper elongated venturi tubes 110 and 112, respectively. As shown in Detail view A, the front venturi tube/front manifold interface has relatively small flow restrictors or baffles 114. As shown in Detail view B, the rear venturi tube/rear manifold interface has relatively larger flow restrictors or baffles 116. Similar to the designs shown in FIGS. 6 and 7, this construction results in the equalization of gas pressure in the manifolds, and thus in the connected burner tubes.

Figure 10:
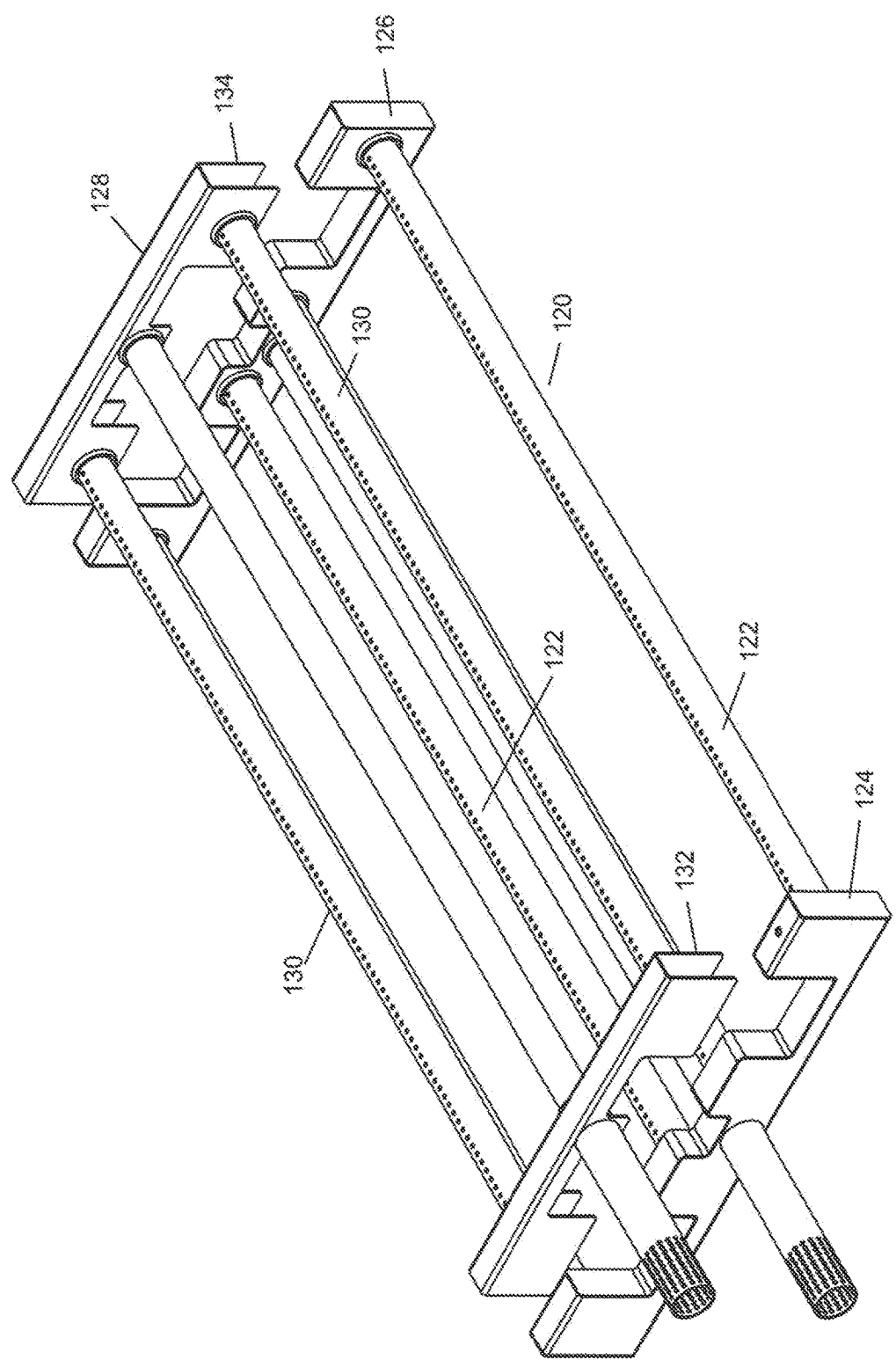
FIG. 10 is an exploded, perspective view of another embodiment of the present burner.
Figure 11:
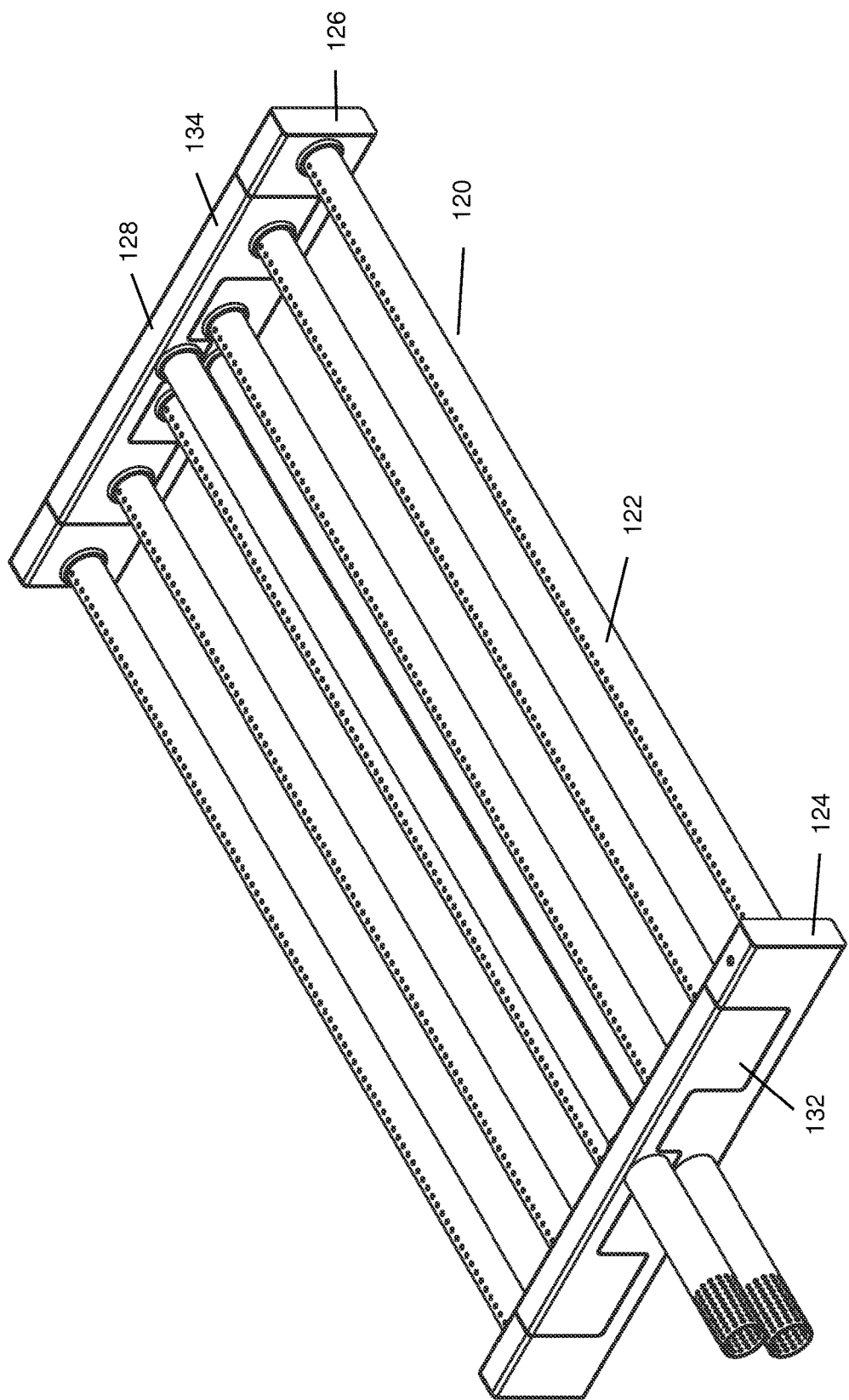
FIG. 11 is a perspective view of the burner shown in the preceding figure, here shown in an assembled condition.

The structures shown in FIGS. 9-11 illustrate the burner constructed in a unique overlapping and interleaved burner structure, thus creating a two segment burner that operates with a dual outlet, single control valve. Such valves are known in the art and need not be described in further detail. The burner sections are secured to one another by means known in the art and may be separable, as for repair or replacement of certain elements, or they may be formed as a single unit, or they may be separate units that are substantially permanently secured together. The operation is such that, for example, the upper section 94, in FIG. 9, can be operated in a low flow/low heat condition. When higher flow/higher temperature is demanded, additional gas/air flow is routed to the lower section 92. Alternately, the operation can be reversed, with the lower section operating as the main or normal burner and the upper section operated as an additional burner to provide a higher than normal heating rate for quickly warming up the grill, cooking in cold conditions, or for very quickly searing meat, among other purposes.

FIGS. 10 and 11 illustrate a larger version of the burner shown in FIG. 9. In the exploded FIG. 10, lower section 120 has four lower burner tubes 122 that are in fluid communication with front and rear lower manifolds 124 and 126 respectively. Upper section 128 has two upper burner tubes 130, that are in fluid communication with front and rear upper manifolds 132 and 134, respectively.

As can be seen in FIG. 10 from the respective ends and walls of the upper and lower manifold sections, upon assembly into the burner element shown in FIG. 11, the upper and lower manifolds are separate structures. The lower manifolds supply a gas/air mixture to the lower burner tubes 122 while the upper manifolds supply a gas/air mixture to the upper tubes 130. The burner is supplied with the gas/air mixture through a dual outlet, single control valve, as is known in the art.

As with the operational description above, relative to the burner shown in FIG. 9, the lower section can be used as the main, or normal burner, with the upper section used to provide a higher than normal heating rate. The relative functions can also be reversed. In addition, all of the burner tubes can be operated simultaneously, to provide a substantially high heat, fast cooking environment, or they can be used separately for slow cooking, warming food, or in combination with flavoring materials, such as wood chips, as in a smoker-type grill.

While an embodiment of a thin profile, multi-manifold multi-tube burner for gas grills and modifications thereof have been shown and described in detail herein, various additional changes and modifications may be made without departing from the scope of the present disclosure or the appended claims.

What is claimed is:

1. A burner assembly for a gas barbeque grill having a gas supply comprising:
   at least one burner tube with a front end, a back end and a plurality of gas outlet burner ports formed therein, a front manifold connected to said front end and a back manifold connected to said back end, both of said manifolds being in fluid communication with said burner tube to allow entry of a flammable gas/air mixture, and a venturi tube without burner ports connected to said front and back manifolds and to the gas supply for transferring gas to the burner assembly; and
   at least one additional burner tube with a front end, a back end, and a plurality of gas outlet ports formed therein, an additional front manifold connected to said front end and an additional back manifold connected to said back end, both of said additional manifolds being in fluid communication with said additional burner tube to allow entry of a flammable gas/air mixture, an additional venturi tube connected to said additional front and back manifolds and to the gas supply for transferring gas to the burner assembly, and said additional venturi tube including a plurality of flow reducing apertures at the additional venturi tube/front manifold interface entry of the gas air mixture that equalizes pressure of the gas/air mixture entering the additional venturi tube/front manifold interface with that of the gas/air mixture entering the additional venturi tube/back manifold interface; and
   wherein the at least one burner tube, front manifold, and back manifold are interleaved and overlapped with the at least one additional burner, additional front manifold, and additional back manifold to form the burner assembly.

2. A burner assembly as defined in claim 1 in which said venturi tube includes a baffle at the venturi tube/back manifold interface inside the back manifold to at least partially inhibit the entry of the gas/air mixture.

3. A burner assembly as defined in claim 1 including a plurality of burner tubes connected to said front and back manifolds.

4. The burner assembly of claim 1, wherein one of the venturi tube and the additional venturi is fed the flammable gas/air mixture from a dual outlet single control valve in a low flow/low heat condition and the other one of the venturi tube and additional venturi tube is simultaneously fed the flammable gas/air mixture from the dual outlet single control valve in a higher flow/higher heat condition.

5. The burner assembly of claim 1, wherein the at least one burner tube and the at least one additional burner tube are disposed at substantially the same level with respect to a cooking surface.

6. A burner assembly for a gas grill comprising:
   at least one lower section comprising:
      at least one lower section burner tube with a front end, a back end and a plurality of gas outlet ports formed therein;
      a lower front manifold connected to the front end of the lower section burner tube and a lower back manifold connected to the back end of the lower section burner tube, both the lower front manifold and the lower back manifold being in fluid communication with the lower section burner tube to allow entry of a flammable gas/air mixture; and a lower venturi tube connected to both the front lower manifold and the back lower manifold; and at least one upper section comprising:

at least one upper section burner tube with a front end, a back end and a plurality of gas outlet ports formed therein;

an upper front manifold connected to the front end of the upper section burner tube and an upper back manifold connected to the back end of the upper section burner tube, both the upper front manifold and the upper back manifold being in fluid communication with the upper section burner tube to allow entry of the flammable gas/air mixture; and an upper venturi tube connected to both the front lower manifold and the back lower manifold;

wherein one of the lower section and upper section may be fed the flammable gas/air mixture from a dual outlet single control valve in a low flow/low heat condition and the other one of the lower section and upper section may be simultaneously fed the flammable gas/air mixture from the dual outlet single control valve in a higher flow/higher heat condition;

wherein an interface of the lower venturi tube to the lower front manifold comprises a first plurality of flow restricting apertures sized to reduce pressure of and air and gas mixture entering the lower front manifold toward a pressure of an air and gas mixture entering the lower back manifold; and wherein an interface of the upper venturi tube to the upper front manifold comprises a second plurality of flow restricting apertures sized to reduce pressure of an air and gas mixture entering the upper front manifold toward a pressure of an air and gas mixture entering the lower back manifold.

7. The burner assembly of claim 6, wherein the at least one upper section burner tube is interleaved with the at least one lower section burner tube and the lower front and rear manifolds are overlapped by the upper front and rear manifolds.

8. The burner assembly of claim 7, wherein the at least one upper section burner tube and the at least one lower section burner tube are disposed at substantially the same level with respect to a cooking surface.

9. A burner assembly for a gas barbeque grill having a gas supply comprising:

at least one burner tube with a front end, a back end and a plurality of gas outlet burner ports formed therein, a front manifold connected to said front end and a back manifold connected to said back end, both of said manifolds being in fluid communication with said burner tube to allow entry of a flammable gas/air mixture, and a venturi tube without burner ports connected to said front and back manifolds and to the gas supply for transferring gas to the burner assembly; and at least one additional burner tube with a front end, a back end, and a plurality of gas outlet ports formed therein, an additional front manifold connected to said front end and an additional back manifold connected to said back end, both of said additional manifolds being in fluid communication with said additional burner tube to allow entry of a flammable gas/air mixture, an additional venturi tube connected to said additional front and back manifolds and to the gas supply for transferring gas to the burner assembly, and said additional venturi tube including a plurality of flow reducing apertures at the additional venturi tube/front manifold interface to at least partially inhibit the entry of the gas air mixture;

wherein the at least one burner tube, front manifold, and back manifold are interleaved and overlapped with the at least one additional burner, additional front manifold, and additional back manifold to form the burner assembly; and wherein said venturi tube includes a baffle at the venturi tube/back manifold interface inside the back manifold to at least partially inhibit the entry of the gas/air mixture.

* * * * *